US012265948B2

(12) United States Patent
Curry et al.

(10) Patent No.: US 12,265,948 B2
(45) Date of Patent: Apr. 1, 2025

(54) PERFORMING COLLABORATION ACTIONS BASED ON COMBINATIONS OF OBJECTS AND CONTEXTUAL INFORMATION

(71) Applicant: Cisco Technology, Inc., San Jose, CA (US)

(72) Inventors: Stewart Curry, Dublin (IE); Sara Mary McCloskey, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 50 days.

(21) Appl. No.: 17/903,279

(22) Filed: Sep. 6, 2022

(65) Prior Publication Data

US 2024/0078515 A1   Mar. 7, 2024

(51) Int. Cl.
*G06Q 10/10*    (2023.01)
*G06Q 10/101*   (2023.01)
*H04L 65/403*   (2022.01)

(52) U.S. Cl.
CPC ......... *G06Q 10/101* (2013.01); *H04L 65/403* (2013.01)

(58) Field of Classification Search
CPC .................... G06Q 10/101; H04L 65/403
See application file for complete search history.

(56) References Cited

U.S. PATENT DOCUMENTS

| 2006/0031775 | A1  | 2/2006  | Sattler et al. |
| 2014/0082522 | A1* | 3/2014  | Gunderson ......... G06F 3/04855 |
| | | | 715/753 |
| 2015/0149404 | A1  | 5/2015  | Lock et al. |
| 2016/0255466 | A1* | 9/2016  | Shuster ............. G06Q 10/1093 |
| | | | 455/414.3 |
| 2016/0366245 | A1  | 12/2016 | Gupta |
| 2018/0011848 | A1* | 1/2018  | Spataro ................. G06Q 10/10 |
| 2019/0394150 | A1  | 12/2019 | Denoue et al. |
| 2020/0272324 | A1* | 8/2020  | Chanda .............. G06F 3/04883 |
| 2021/0142103 | A1* | 5/2021  | Xie ........................... G06N 5/04 |
| 2021/0409537 | A1  | 12/2021 | Vendrow |

* cited by examiner

*Primary Examiner* — Stephen S Hong
*Assistant Examiner* — Darrin Hope
(74) *Attorney, Agent, or Firm* — Edell, Shapiro & Finnan, LLC

(57) ABSTRACT

In one example embodiment, a plurality of objects selected by a user on a user interface for a collaboration tool are identified. The plurality of objects include at least two different types of objects. One or more collaboration actions to perform are determined by a computing device based on the types and contextual information for the plurality of objects. The one or more collaboration actions are presented on the user interface. A presented collaboration action is initiated from the user interface.

20 Claims, 14 Drawing Sheets

PERFORMING COLLABORATION ACTIONS BASED ON COMBINATIONS OF OBJECTS AND CONTEXTUAL INFORMATION

TECHNICAL FIELD

The present disclosure relates to collaboration tools.

BACKGROUND

Collaboration tools provide a number of different actions, such as creating a group chat, scheduling a meeting, or calling a contact. These tools are forming an integral part of our professional lives, especially as working remotely has become widespread. Various collaboration tools have been available, and although features of these tools have been added and media quality has been improved, the overall topology of a user experience has remained relatively unchanged. A current approach of collaboration tools requires a user to structure their needs to fit the tool or application. In other words, the user-experience is fixed, where the user follows the same flow each time. In particular, the user selects a workload (e.g., message, meet, call, etc.), communication tool (e.g., meeting application, chat, email, etc.), topic/subject, people, and content for the collaboration. This approach is inflexible, does not map to a user thought-process, nor considers changes to the user thought-process depending on the context.

DESCRIPTION OF EMBODIMENTS

Overview

Figure 1:
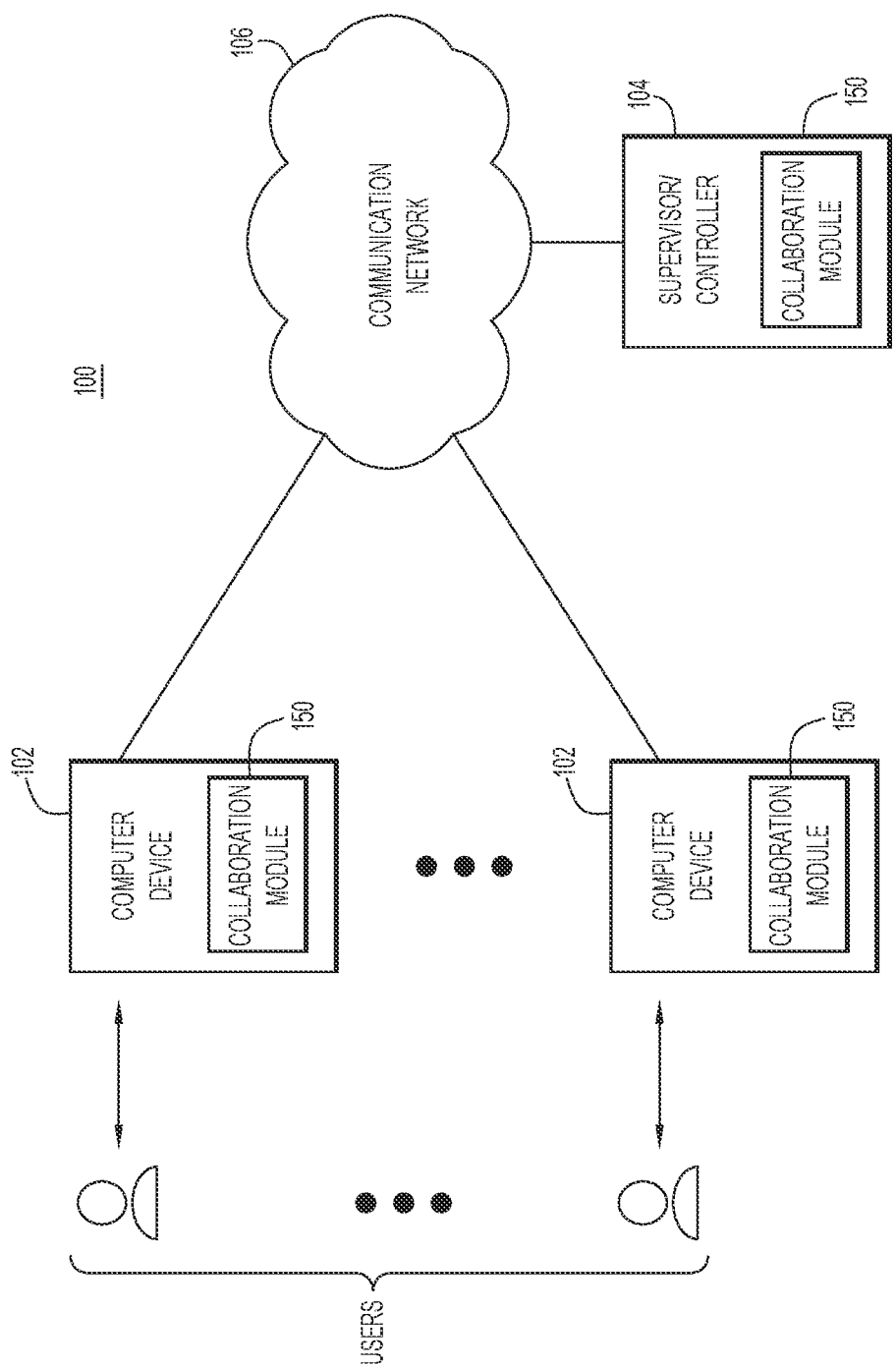
FIG. 1 is a block diagram of an example online collaboration environment, according to an example embodiment.

In one example embodiment, a plurality of objects selected by a user on a user interface for a collaboration tool are identified. The plurality of objects include at least two different types of objects. One or more collaboration actions to perform are determined by a computing device based on the types and contextual information for the plurality of objects. The one or more collaboration actions are presented on the user interface. A presented collaboration action is initiated from the user interface.

Example Embodiments

An example embodiment pertains to providing a user experience for a collaboration tool that is context-aware and flexible. This enables a user to organically create ways to collaborate in a manner that matches the thought-process of the user, rather than the topology of the application. The example embodiment enables the user to select objects or elements (e.g., people/contacts, content, events, etc.) on a user interface for a collaboration, and combine them in a fluid and intuitive way, thereby removing friction from the user experience.

An example embodiment enables a user to place (e.g., drag and drop, etc.) objects or elements to facilitate collaboration in an order that makes sense for the user. Dragging and dropping of objects is extended to enable different types of objects to be combined and collaboration actions to be determined and suggested. Instead of just being able to drag and drop people to add them to a group or drag and drop files to attach them to an email, the example embodiment provides a collaboration area on a user interface for a collaboration tool to receive any type of object. The placement of objects in the collaboration area generates suggested collaboration actions for the user based on the combination of object types selected and other contextual attributes.

In this manner, the user can select objects or elements for a collaboration in an order that makes sense for the user. A natural path can be followed as the user builds the experience. For example, a user may view a message in a group chat that indicates "we should talk tomorrow". The user is able to drag to the collaboration area of the user interface the word "tomorrow" and people (or contacts) with whom the user desires to chat. An example embodiment detects the objects in the collaboration area, and may suggest a scheduled meeting for the next day with the selected people as attendees.

Further, a user may finish working on a document, and drag the document or file from their file system into the collaboration area on the user interface. In addition, the user may drag people (or contacts) from their contact list into the collaboration area of the user interface. In this case, an example embodiment detects the objects in the collaboration area and may suggest creating a group chat with the selected contacts as members of the group chat, the document or file name as a suggested group chat title, and the document or file uploaded to the group chat.

In addition, a user may attend a meeting and realize that a contact has not been invited. In this case, the user drags the contact to the collaboration area on the user interface. An example embodiment detects the object in the collaboration area, and may suggest inviting the contact to the meeting based on a context of the user (e.g., the user is currently attending the meeting).

FIG. 1 illustrates a block diagram of an example online collaboration environment 100 in which an embodiment presented herein may be implemented. Environment 100 includes multiple computer devices 102 (collectively referred to as computer devices, participant devices, or platforms) operated by local users/participants, a supervisor or server (also referred to as a "controller") 104 configured to provide a collaboration tool to support online (e.g., web-based or over-a-network) collaborative meetings or other collaboration events between the computer devices, and a communication network 106 communicatively coupled to the computer devices and the supervisor. Computer devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). Computer devices 102 may communicate with each other, and with supervisor 104, over communication network 106 using a variety of known or hereafter developed communication protocols. For example, the computer devices 102 and supervisor 104 may exchange Internet Protocol (IP) data packets, Realtime Transport Protocol (RTP) media packets (e.g., audio and video packets), and so on.

Computer devices 102 may each host a collaboration module 150 for determining collaboration actions and initiating those actions (via supervisor 104) in substantially the same manner described below. In an embodiment, supervisor 104 or other server system coupled to communication network 106 may host collaboration module 150 for determining and initiating collaboration actions in substantially the same manner described below. In this case, information of objects placed in a collaboration area of a user interface for the collaboration tool may be provided to collaboration module 150 on supervisor 104 for processing, and the resulting collaboration actions are determined and provided to computer devices 102 for initiation of the collaboration actions from a user interface for the collaboration tool. However, the collaboration module may be implemented within a collaboration tool or platform (e.g., online meeting platform, etc.), as a desktop/mobile widget, and/or an embedded application. The collaboration module may interact with a collaboration tool or platform for workloads and/or performance of suggested actions.

Figure 2:
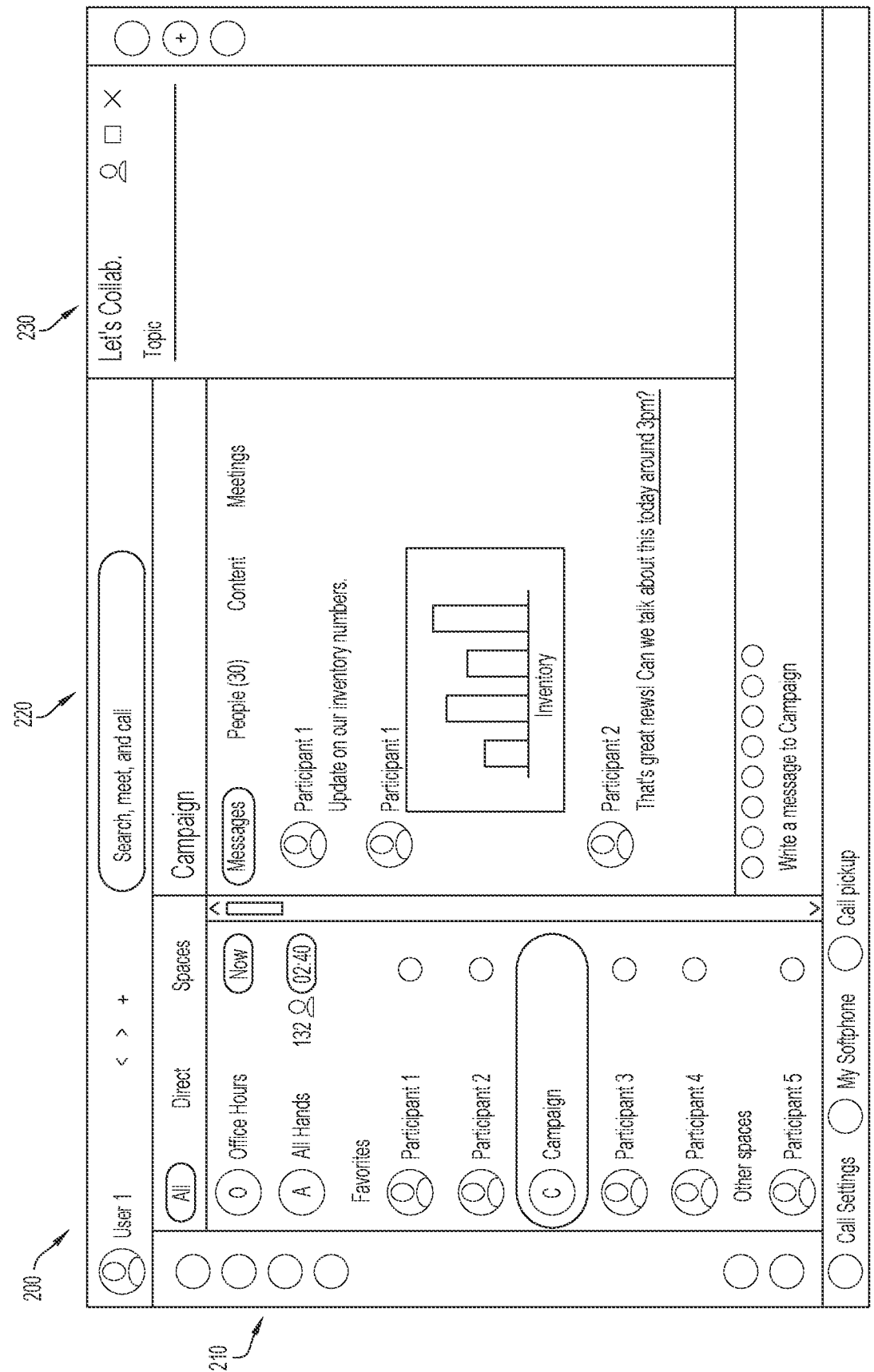
FIG. 2 illustrates a user interface for a collaboration tool, according to an example embodiment.

With continued reference to FIG. 1, FIG. 2 illustrates a user interface 200 for a collaboration tool, according to an example embodiment. User interface 200 may be provided by collaboration module 150, or be provided by a collaboration tool. The collaboration module may modify the user interface, and/or service or process interactions on the user interface. User interface 200 includes a contact area or pane 210, a message area or pane 220, and a collaboration area or pane 230. Contact area 210 provides contacts of a user and corresponding information (e.g., name, contact status (e.g., available, participating in a communication session, etc.), etc.). Message area 220 provides messages (e.g., conversations, threads, messages, etc.) of the user contacts. Collaboration area 230 may receive various objects or elements to facilitate collaboration actions. However, the contact, message, and collaboration areas may be of any shape or size, may provide any information, and may be disposed at any locations. User interface 200 enables a user to place (e.g., drag and drop, etc.) objects in collaboration area 230 to facilitate collaboration in an order that makes sense for the user. The dragging and dropping of objects enables different types of objects to be combined and collaboration actions to be determined and suggested. The collaboration area may receive any type of object (e.g., contact, chat, document, text, date or time object, etc.). The placement of objects in the collaboration area generates suggested collaboration actions for the user based on the combination of object types selected and other contextual attributes. The collaboration module may detect objects placed in the collaboration area, and/or receive information of objects placed in the collaboration area.

Figure 3:
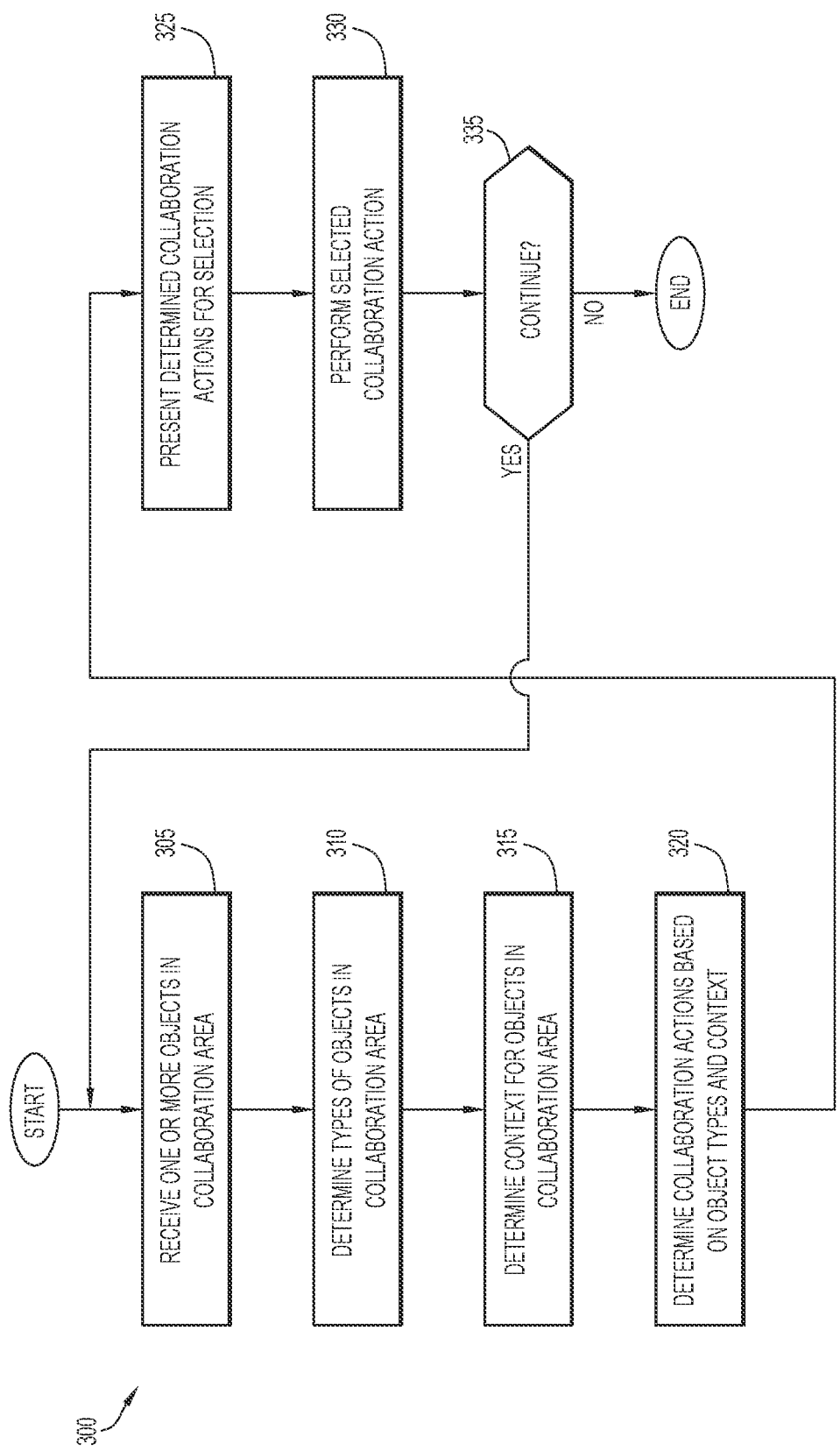
FIG. 3 is a flowchart of a method for determining and performing collaboration actions, according to an example embodiment.

With continued reference to FIGS. 1 and 2, FIG. 3 illustrates a flowchart of an example method 300 for determining and performing collaboration actions, according to an example embodiment. Initially, a user accesses user interface 200 for a collaboration tool (e.g., provided and/or serviced by collaboration module 150) from a computer device 102. Collaboration area 230 receives one or more objects at operation 305. The objects may be presented on user interface 200, and selected and/or placed (e.g., dragged and dropped) in the collaboration area by the user. The objects selected and/or placed in the collaboration area may be of any type. By way of example, the types of objects selected and/or placed in the collaboration area may include people (or contacts), files, links, messages, events, recordings, timestamps, and group chats. Various contextual information may also be selected and/or placed in the collaboration area, included within an object, or implicitly extracted from the environment, and may include a current time, the status of a user (e.g., currently in a meeting or participating on a call), an organization directory structure, time zones of relevant contacts, and/or calendar availability of the user and relevant contacts. The contextual information may be used to derive a context for the objects selected and/or placed in the collaboration area. The context may pertain to any status or attributes of the objects or users (e.g., a status or availability of a user, a time or date, a type of collaboration currently being conducted, a type of file or document, etc.). Object attributes and/or contextual information may be used for any attributes of the suggested actions (e.g., title, date or time for action, participants, etc.). Objects may be selected for suggestion and performance of collaboration actions in any fashion (e.g., highlight objects, cursor selection, placement of objects in areas, select from a listing of objects, etc.). The suggested actions may be determined based on the selected objects (and the corresponding context or contextual information) in substantially the same manner described below.

Collaboration module 150 may detect and identify the objects placed in collaboration area 230, and/or receive information of the objects placed in the collaboration area for identification of the objects. The completion of object placement in the collaboration area may be detected based on actuation of an actuator of the user interface, or time intervals or delays (e.g., expiration of a certain time period after an object is placed in the collaboration area without placement of another object, etc.). The types of the objects placed in collaboration area 230 are determined at operation 310. The type of an object may be ascertained from metadata or other information contained in, or stored for, the object.

The context for the objects placed in collaboration area 230 is determined at operation 315. The context may be ascertained from the various contextual information placed in the collaboration area or included within an object placed in the collaboration area. In addition, conventional or other natural language processing techniques may be applied to textual information of the objects placed in the collaboration area to determine the context or contextual information. The textual information may be obtained from text, or from text resulting from extraction or conversion of other forms of objects (e.g., audio, images, etc.) placed in the collaboration area. The natural language processing may include various functions, such as entity extraction (e.g., identification of entities), relationship extraction (e.g., identification of relationships between entities, such as parent child, contains, is a, etc.), semantic analysis, and/or part-of-speech (POS) tagging or identification. For example, entity identification may recognize contacts or people placed in the collaboration area, relationship extraction may identify a relationship with the user, and semantic analysis may infer a meaning of a word (e.g., a word associated with a status, a word associated with a time or date to determine a time or date, such as "tomorrow", "today", etc.).

One or more collaboration actions are determined at operation 320 based on the types and context (or contextual information) of objects placed in collaboration area 230. In an embodiment, the objects placed in the collaboration area are mapped to one or more collaboration actions (e.g., schedule a meeting, create a group chat, etc.), and the objects are combined in a workload for the actions. The workload may include a user-selected amount of context. The combination of the object types placed in the collaboration area along with the current context produces a matrix of entries, each with primary and secondary suggested actions. By enabling various objects to be placed in the collaboration area, emergent behaviors may be allowed, thereby providing a sandbox (and not a set sequence).

Figure 4:
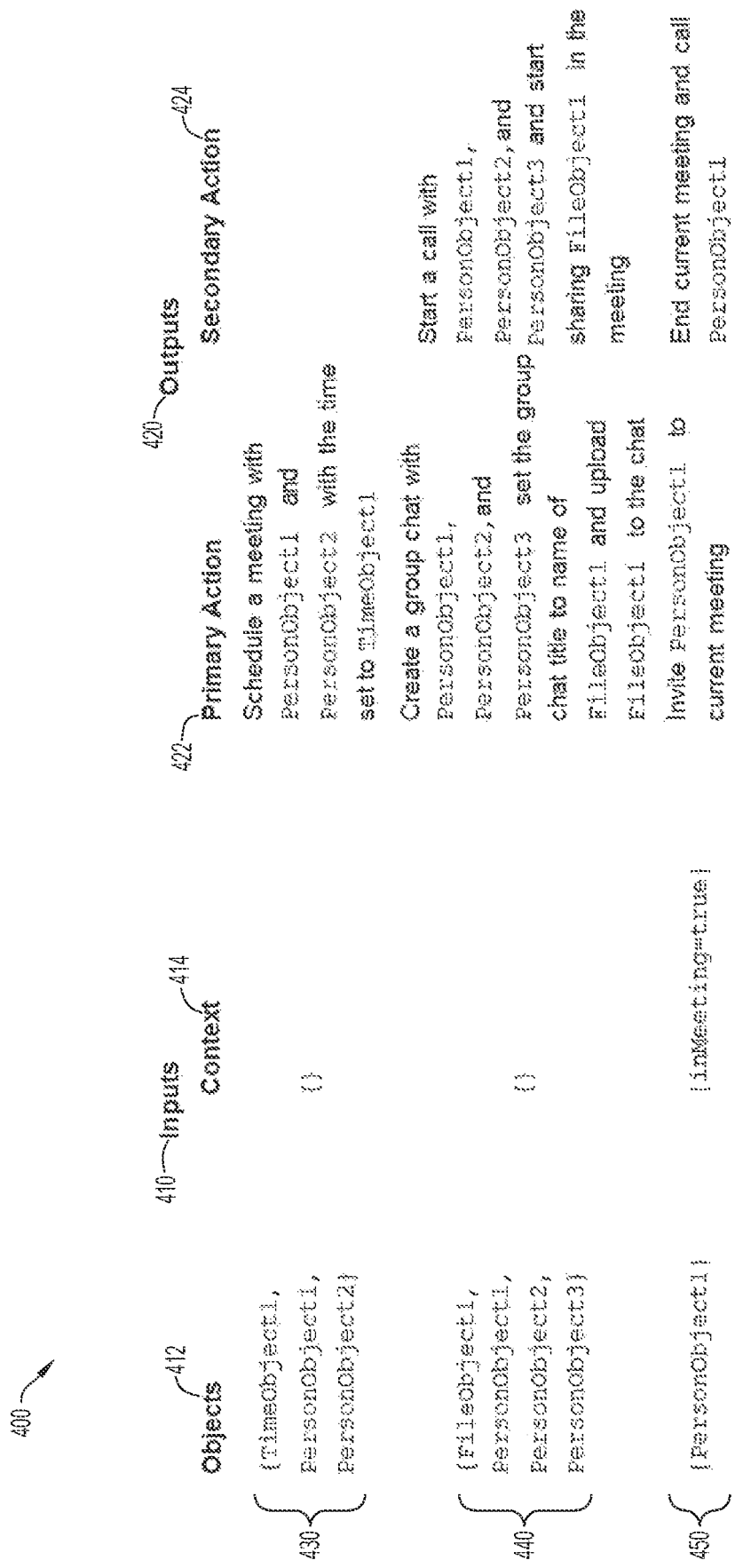
FIG. 4 illustrates a matrix for mapping object types and context to collaboration actions, according to an example embodiment.
Figure 5:
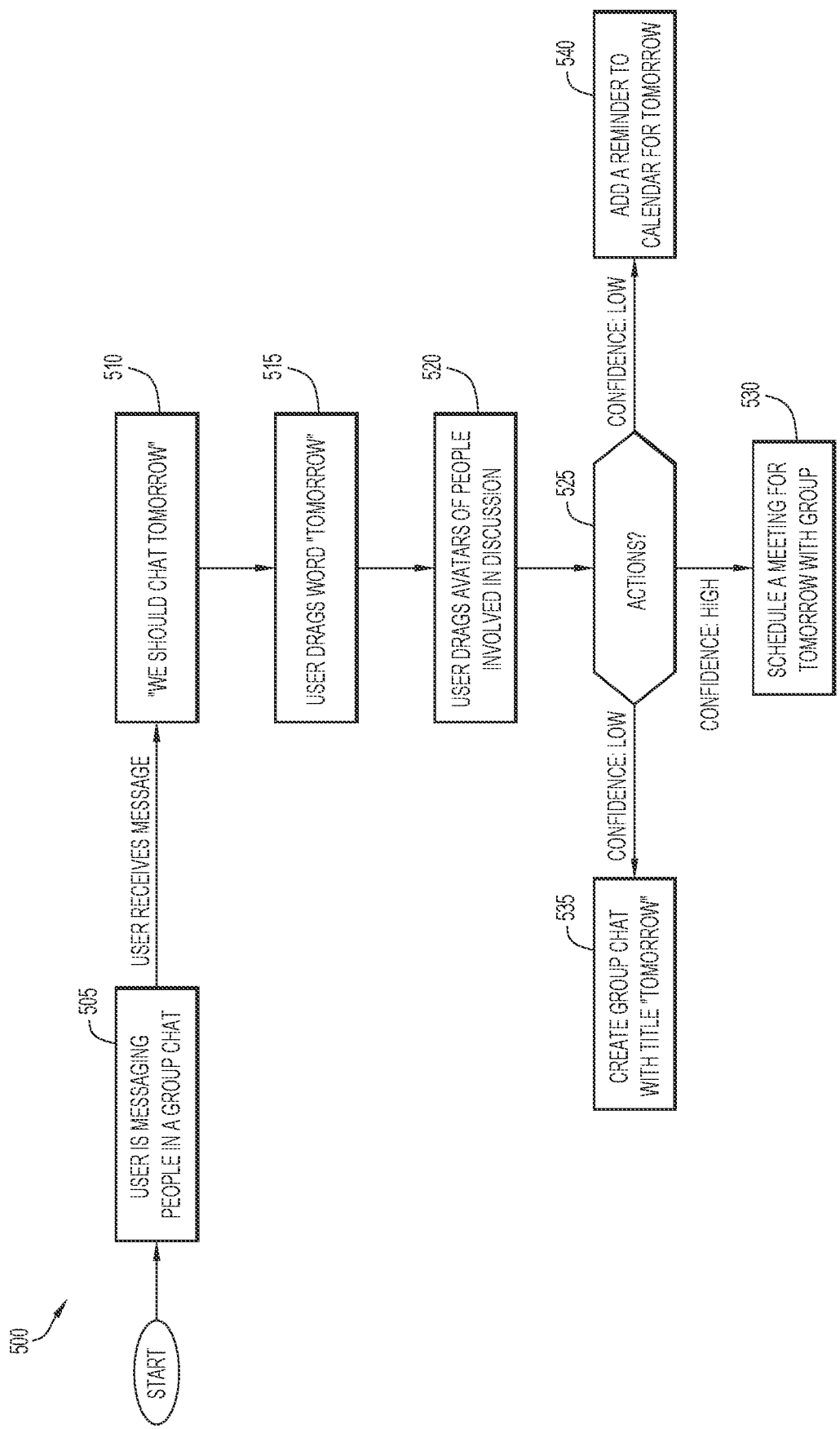
FIG. 5 is a flowchart of a method for determining collaboration actions based on time and person objects, according to an example embodiment.
Figure 6:
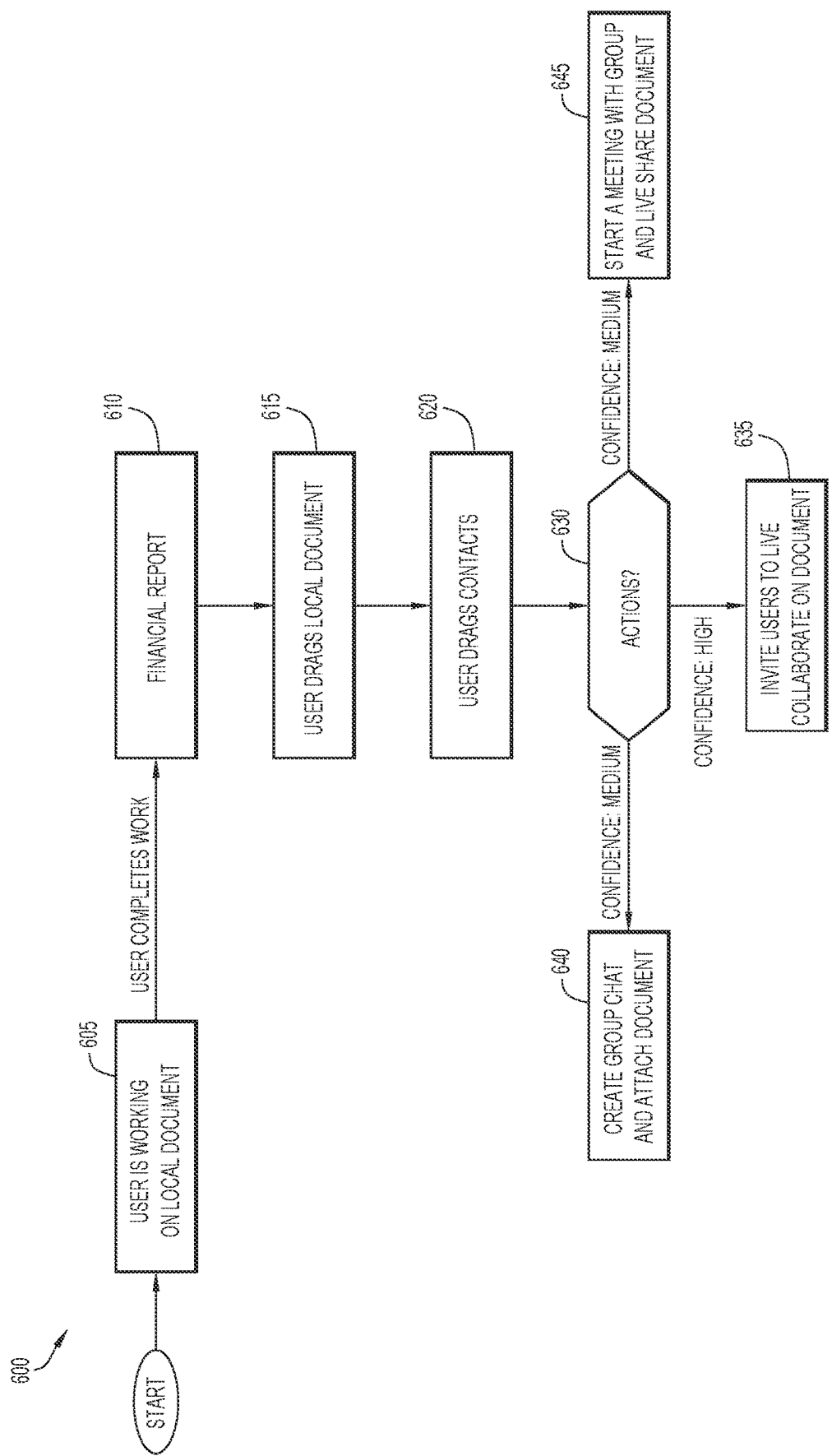
FIG. 6 is a flowchart of a method of determining collaboration actions based on a document and person objects, according to an example embodiment.
Figure 7:
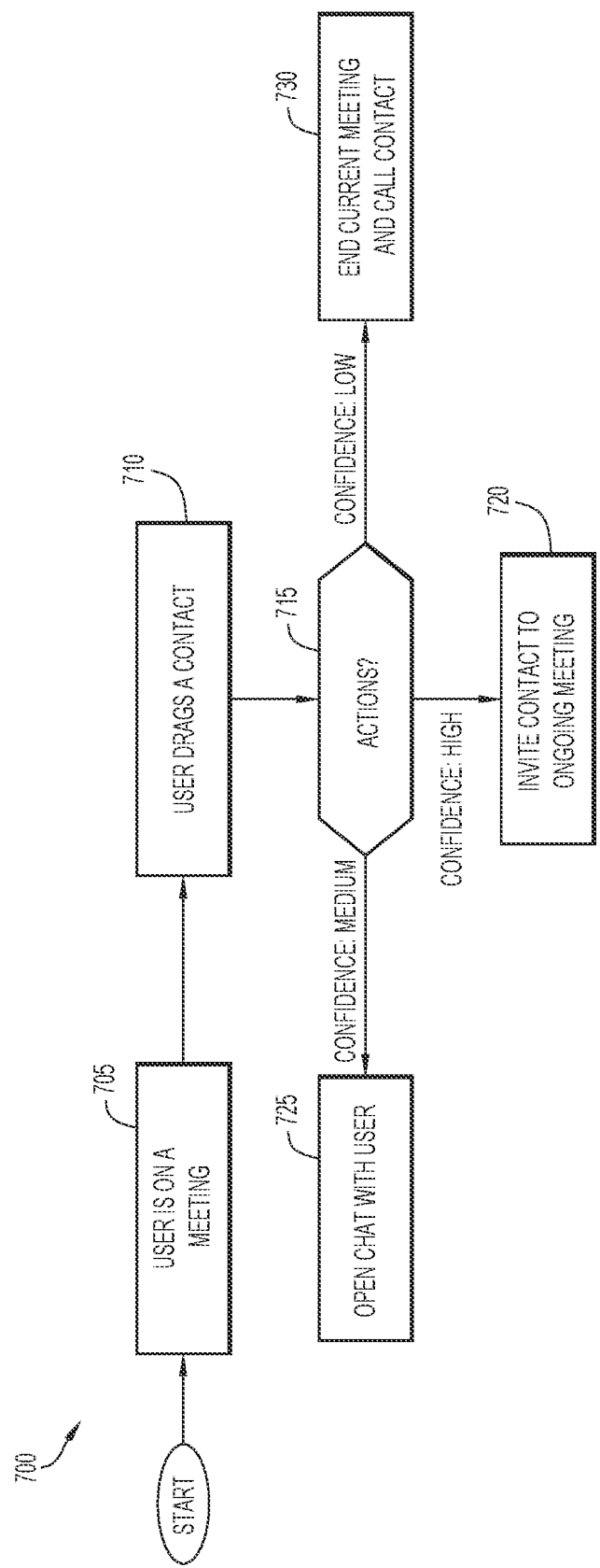
FIG. 7 is a flowchart of a method for determining collaboration actions based on a user status and a person object, according to an example embodiment.

Referring to FIG. 4, a matrix 400 maps combinations of objects and context (or contextual information) to collaboration actions, according to an example embodiment. Matrix 400 may be represented in the form of a table. The matrix indicates inputs 410 and outputs 420 corresponding to columns of the table. Inputs 410 correspond to field or column 412 for object types and field or column 414 for context (or contextual information), while outputs 420 correspond to field or column 422 for a primary action and field or column 424 for a secondary action. Rows of the table include entries (e.g., entries 430, 440, and 450 as shown in FIG. 4) each mapping inputs (e.g., object types of field 412 pertaining to objects placed in collaboration area 230 and context of the objects) to outputs (e.g., a primary action and a secondary action). The matrix and entries may specify any quantity or combinations of inputs mapped to one or more desired actions (e.g., a primary action and zero or more secondary actions, etc.). The matrix may initially be predetermined and updated over time as new actions are learned, desired, and/or become available. In addition, information is optional for the context and secondary action fields (e.g., specifying the context and/or secondary actions may be optional based on the scenario). The matrix may include any quantity of entries mapping any quantity of any inputs and context or contextual information to any quantity of any actions.

By way of example, entry 430 indicates that when a time object (e.g., word, time, date, etc.) and two person objects (e.g., contacts, etc.) are received in collaboration area 230 (e.g., placed by a user in the collaboration area, etc.), the suggested primary action is to schedule a meeting for the user with the people corresponding to the person objects at a time indicated by the time object. Entry 430 does not specify a secondary action and, therefore, no secondary action is suggested for this entry (or combination of inputs). Since the context field is empty for this entry, the primary action may be suggested for any context.

By way of further example, entry 440 indicates that when a file object (e.g., document, file, etc.) and three person objects (e.g., contacts, etc.) are received in collaboration area 230 (e.g., placed by a user in the collaboration area, etc.), the suggested primary action is to create a group chat for the user with the people corresponding to the person objects. The group chat title is set to the name of the file or document indicated by the file object, and the file or document indicated by the file object is uploaded to the group chat. The suggested secondary action is to start a call for the user with the people corresponding to the person objects and share the file or document indicated by the file object. Since the context field is empty for this entry, the primary and secondary actions may be suggested for any context. Entry 450 indicates that when a person object (e.g., contact, etc.) is received in collaboration area 230 (e.g., placed by a user in the collaboration area, etc.) with a context indicating that the user is in a meeting, the suggested primary action is to invite the person indicated by the person object to the meeting. The suggested secondary action is to end the meeting and start a call for the user with the person corresponding to the person object. Since the context field specifies a context, the primary and secondary actions are suggested in response to occurrence of the specified context.

The determined object types and context are applied to matrix 400 to ascertain the primary action and optional secondary action to suggest. For example, the determined object types and context are compared to the object types and context in fields 412, 414 to identify a matching entry. The corresponding primary and secondary actions indicated in fields 422, 424 of the matching entry are retrieved and provided as the suggested actions. When only a primary action is specified in a matching entry, the primary action may be suggested without a secondary action. Further, when no context is specified in an entry, the entry may be considered to match when the determined object types match the object types in field 412 (e.g., the primary action and optional secondary action are suggested for all contexts).

In an embodiment, machine learning may be used to determine the collaboration actions based on the combination of inputs (e.g., objects received in collaboration area 230 and context). A machine learning model may be trained and updated to improve the suggested actions over time based on a user history of selected actions. The machine learning model may include any conventional or other machine learning models (e.g., mathematical/statistical, classifiers, feed-forward, recurrent, convolutional, deep learning, or other neural networks, etc.) to determine one or more actions based on the objects received in collaboration area 230 and context. Collaborative filtering approaches based on other users within the user's organization may also be used to improve the suggested actions over time.

By way of example, the machine learning model may employ a neural network. For example, neural networks may include an input layer, one or more intermediate layers (e.g., including any hidden layers), and an output layer. Each layer includes one or more neurons, where the input layer neurons receive input (e.g., object types and context, feature vectors of the object types and context, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of various combinations of object types with or without context as input and corresponding classifications (or collaboration actions) as outputs, where the neural network attempts to produce the provided output (or classification) and uses an error from the output (e.g., difference between produced and known outputs) to adjust weight (and bias) values (e.g., via backpropagation or other training techniques).

In an embodiment, various combinations of object types with or without context may be used for the training set as input, while their known corresponding classifications (e.g., primary and zero or more secondary actions to perform) may be used for the training set as known output. In an embodiment, feature vectors may be extracted from the object types and context and used for the training set as input, while their known corresponding classifications (e.g., primary and zero or more secondary actions to perform) may be used for the training set as known output. A feature vector may include any suitable features of the object types and context (e.g., object features (e.g., data type, etc.), context features (e.g., status, date/time, etc.), etc.). However, the training set may include any desired object types with or without context for the different classes (or actions) to learn the characteristics for determining the actions.

The output layer of the neural network indicates a classification (e.g., associated with one or more actions, etc.) for input data. By way of example, the classes used for the classification may include a class associated with each combination of primary and zero or more secondary actions (e.g., preferably indicating the secondary actions in order of confidence). The output layer neurons may provide a classification (or specify a particular class) that indicates the primary and zero or more secondary actions, and may further indicate a probability for the input data being within a corresponding class. The class associated with the highest probability is preferably selected as the class for the input data. In other words, the class associated with the highest probability indicates the primary and zero or more secondary actions (e.g., in order of confidence for the secondary actions) for the input data (e.g., object types with or without context).

Further, output layer neurons may be associated with the different classes each pertaining to a corresponding action, and may further indicate a probability for the input data being within a corresponding class (e.g., a probability of the input data being in a class associated with an action, etc.). The class associated with the highest probability is preferably selected as the class indicating the primary action for the input data. Classes associated with the next highest probabilities may be selected for indicating the secondary actions. The probabilities may be compared to a probability threshold to determine qualification as primary and/or secondary actions. The probabilities may further indicate a confidence of the primary and secondary actions.

The types of objects received in collaboration area 230 and the context are provided to the neural network to determine the primary and zero or more secondary actions to suggest.

Referring back to FIG. 3, user interface 200 presents the determined primary and zero or more secondary actions at operation 325. The presented actions are preferably displayed in collaboration area 230, but may be presented at any location on, or by another interface or window associated with, user interface 200. The primary actions are actions that are most likely to be relevant to a user in a current context, while the secondary actions are actions that may not seem as relevant, but could still be useful. A suggested action is selected and performed at operation 330. The user may select a presented action to initiate performance of the action, or an action may be automatically selected (e.g., by collaboration module 150 based on confidences, pre-configured settings or parameters, etc.) and initiated or performed. The above process is repeated from operation 305 to process objects received in collaboration area 230 in substantially the same manner described above until termination (e.g., terminating access to the collaboration tool, etc.) as determined at operation 335.

Example embodiments may be used for suggesting and performing collaboration actions for various scenarios. With continued reference to FIGS. 1-4, FIG. 5 is a flowchart of a method 500 for determining collaboration actions based on time and person objects, according to an example embodiment. Initially, a user accesses user interface 200 for a collaboration tool (e.g., provided by and/or serviced by collaboration module 150) from a computer device 102, and sends messages within a group chat at operation 505. A message 510 in the group chat may indicate a further chat session the next day (e.g., "We should chat tomorrow" as viewed in FIG. 5). Collaboration area 230 receives a text object (e.g., "tomorrow" from message 510) at operation 515, and one or more person objects (or contacts) of users in the discussion associated with message 510 at operation 520. The user may place (e.g., drag and drop) these objects in collaboration area 230 on user interface 200. One or more collaboration actions are determined at operation 525 based on the types and context of objects placed in collaboration area 230 in substantially the same manner described above. For example, a determined action 530 with a highest confidence (e.g., a primary action) may include scheduling a meeting for the next day with users associated with the person objects. A determined action 535 with a lower (or low) confidence (e.g., a secondary action) may include creating a group chat for the user with a title of the text object (e.g., "tomorrow" as viewed in FIG. 5) and including users associated with the person objects. In addition, a determined action 540 with a lower (or low) confidence (e.g., a secondary action) may include adding a reminder for a group chat to the user calendar for the next day.

User interface 200 presents the determined primary and secondary actions. The presented actions are preferably displayed in collaboration area 230, but may be presented at any location on, or by another interface or window associated with, user interface 200. The user may select an action to initiate performance, or an action may be automatically selected by collaboration module 150 (e.g., based on confidences, pre-configured settings or parameters, etc.) and initiated or performed.

With continued reference to FIGS. 1-4, FIG. 6 is a flowchart of a method 600 for determining collaboration actions based on a document and person objects, according to an example embodiment. Initially, a user accesses user interface 200 for a collaboration tool (e.g., provided and/or serviced by collaboration module 150) from a computer device 102, and engages a local document at operation 605. A completed document 610 is produced (e.g., a financial document as viewed in FIG. 6). Collaboration area 230 receives a file object (e.g., associated with document 610) at operation 615, and one or more person objects (or contacts) associated with the user at operation 620. The user may place (e.g., drag and drop) these objects in collaboration area 230 on user interface 200. One or more collaboration actions are determined at operation 630 based on the types and context of objects placed in collaboration area 230 in substantially the same manner described above. For example, a determined action 635 with a highest confidence (e.g., a primary action) may include inviting users associated with the person objects to collaborate (e.g., a live collaboration) with the user on the document. A determined action 640 with a lower (or medium) confidence (e.g., a secondary action) may include creating a group chat for the user including the users associated with the person objects, and attaching the document associated with the file object in the group chat. In addition, a determined action 645 with a lower (or medium) confidence (e.g., a secondary action) may include starting a meeting with the users associated with the person objects, and sharing (e.g., live sharing) the document associated with the file object.

User interface 200 presents the determined primary and secondary actions. The presented actions are preferably displayed in collaboration area 230, but may be presented at any location on, or by another interface or window associated with, user interface 200. The user may select an action to initiate performance, or an action may be automatically selected by collaboration module 150 (e.g., based on confidences, pre-configured settings or parameters, etc.) and initiated or performed.

With continued reference to FIGS. 1-4, FIG. 7 is a flowchart of a method 700 for determining collaboration actions based on a user status and a person object, according to an example embodiment. Initially, a user accesses user interface 200 for a collaboration tool (e.g., provided and/or serviced by collaboration module 150) from a computer device 102, and participates in a meeting at operation 705. Collaboration area 230 receives a person object (or contact) associated with the user at operation 710. The user may place (e.g., drag and drop) the object in collaboration area 230 on user interface 200. One or more collaboration actions are determined at operation 715 based on the type and context of the object placed in collaboration area 230 in substantially the same manner described above. For example, a determined action 720 with a highest confidence (e.g., a primary action) may include inviting a user associated with the person object to the meeting. A determined action 725 with a lower (or medium) confidence (e.g., a secondary action) may include creating a chat for the user with the user associated with the person object. In addition, a determined action 730 with a lower (or low) confidence (e.g., a secondary action) may include ending the meeting and placing a call to the user associated with the person object.

User interface 200 presents the determined primary and secondary actions. The presented actions are preferably displayed in collaboration area 230, but may be presented at any location on, or by another interface or window associated with, user interface 200. The user may select an action to initiate performance, or an action may be automatically selected by collaboration module 150 (e.g., based on confidences, pre-configured settings or parameters, etc.) and initiated or performed.

Figure 8A:
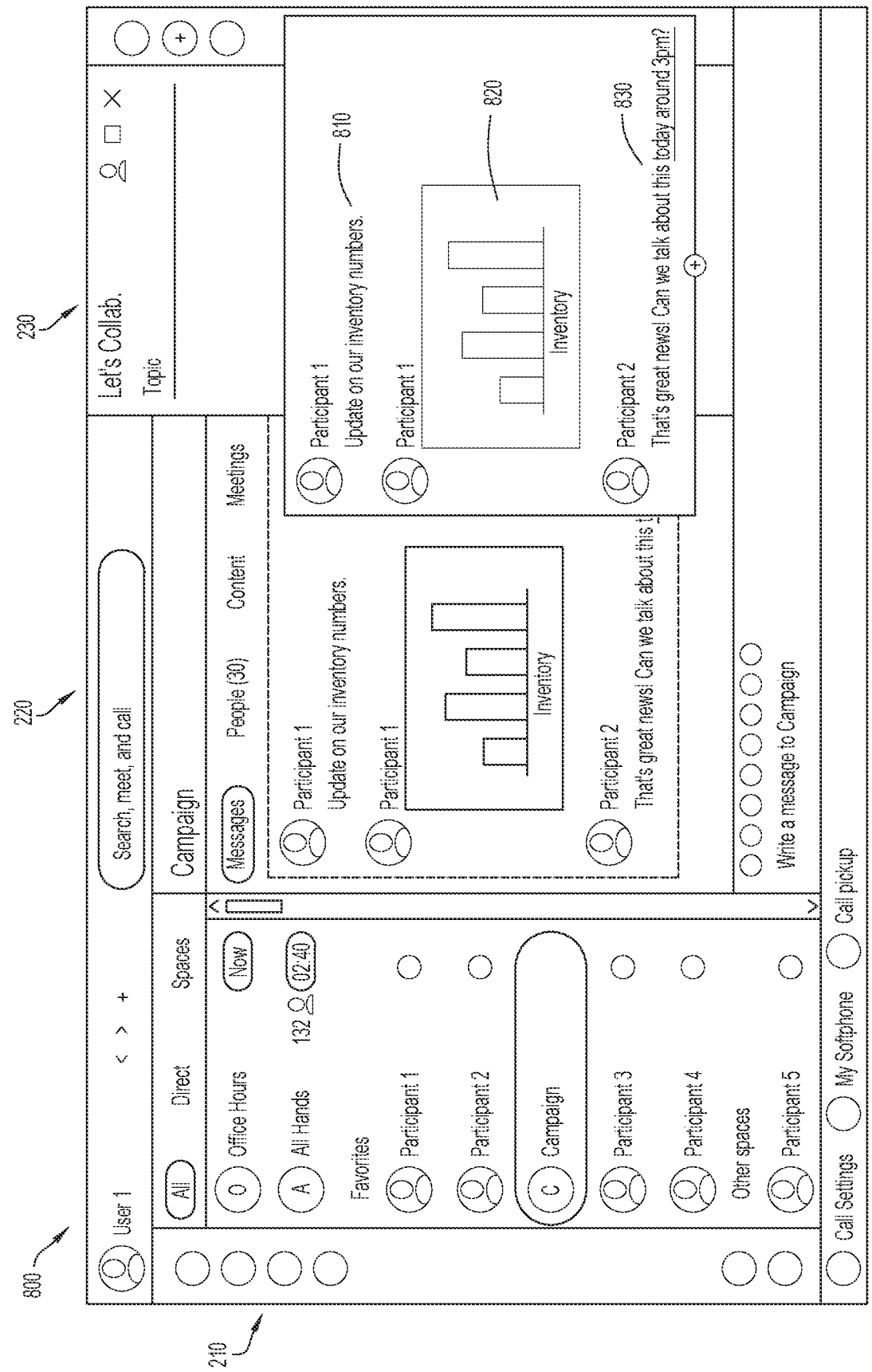
FIG. 8A illustrates a user interface for a collaboration tool with objects placed in a collaboration area, according to an example embodiment.

With continued reference to FIGS. 1-4, FIGS. 8A and 8B illustrate a user interface of a collaboration tool providing a group chat for objects placed in a collaboration area, according to an example embodiment. User interface 800 may be provided by collaboration module 150, or be provided by a collaboration tool. The collaboration module may modify the user interface, and/or service or process interactions on the user interface. User interface 800 is substantially similar to user interface 200 described above, and includes contact area or pane 210, message area or pane 220, and collaboration area or pane 230. Contact area 210 provides contacts of a user and corresponding information (e.g., name, contact status (e.g., available, participating in a communication session, etc.), etc.). Message area 220 provides messages (e.g., conversations, threads, messages, etc.) of the user contacts. Collaboration area 230 may receive various objects or elements to facilitate collaboration actions. User interface 200 enables a user to place (e.g., drag and drop, etc.) objects in collaboration area 230 to facilitate collaboration. In this example, messages 810, 820, and 830 may be selected from message pane 220 and placed (e.g., dragged and dropped) by a user into collaboration area 230 (FIG. 8A).

Figure 8B:
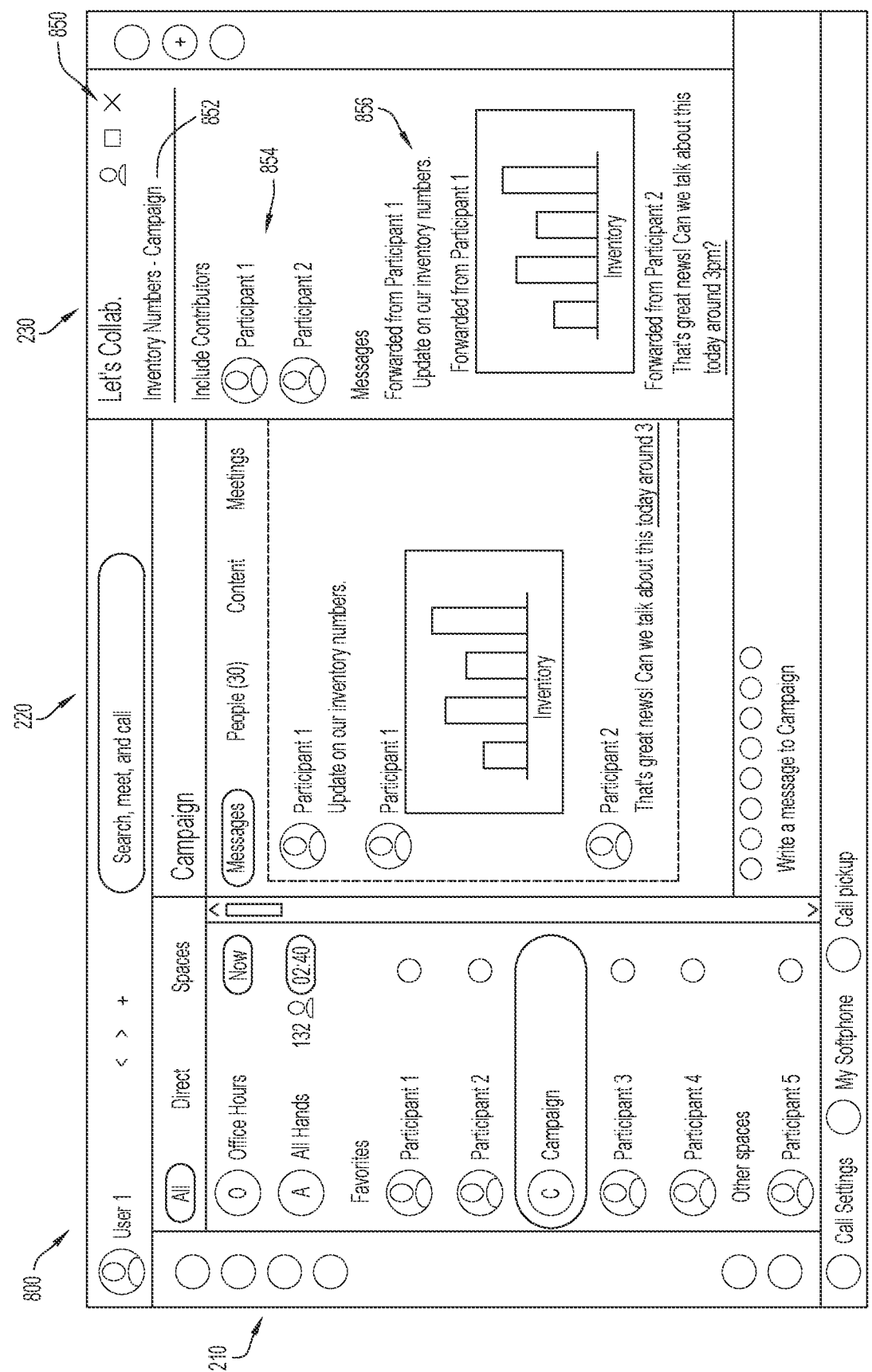
FIG. 8B illustrates the user interface of FIG. 8A providing a group chat for the objects placed in the collaboration area, according to an example embodiment.

The collaboration module analyzes the messages in collaboration area 230 to determine collaboration actions in substantially the same manner described above. In this example case, the collaboration module suggests creation of a group chat 850 in collaboration area 230 (FIG. 8B). The group chat suggested in the collaboration area includes a suggested title 852 and senders of the selected messages 854. In addition, messages 810, 820, and 830 placed in the collaboration area form a basis of messages 856 for the new group chat. The user may initiate the suggested group chat from user interface 800.

With continued reference to FIGS. 1-4, FIGS. 9A-9C illustrate a user interface of a collaboration tool providing a meeting with an attached document, according to an example embodiment. User interface 900 may be provided by collaboration module 150, or be provided by a collaboration tool. The collaboration module may modify the user interface, and/or service or process interactions on the user interface. User interface 900 is similar to user interface 200 described above, and includes contact area or pane 210, and message area or pane 220. Contact area 210 provides contacts of a user and corresponding information (e.g., name, contact status (e.g., available, participating in a communication session, etc.), etc.). Message area 220 provides messages (e.g., conversations, threads, messages, etc.) of the user contacts. User interface 900 includes a collaboration area 910 (e.g., corresponding to collaboration area 230) in a form of a window or dialog box disposed toward an upper right portion of user interface 900 (e.g., as viewed in FIGS. 9B and 9C). However, the contact, message, and collaboration areas may be of any shape or size, may provide any information, and may be disposed at any locations. Collaboration area 910 may receive various objects or elements to facilitate collaboration actions. User interface 900 enables a user to place (e.g., drag and drop, etc.) objects in collaboration area 910 to facilitate collaboration. In this example, date object (or information) 905 in message area 220 (e.g., "today around 3 PM?" as viewed in FIG. 9A) is highlighted or selected by a user, and each actionable object of user interface 900 is associated with a graphic symbol to trigger a collaboration.

Figure 9A:
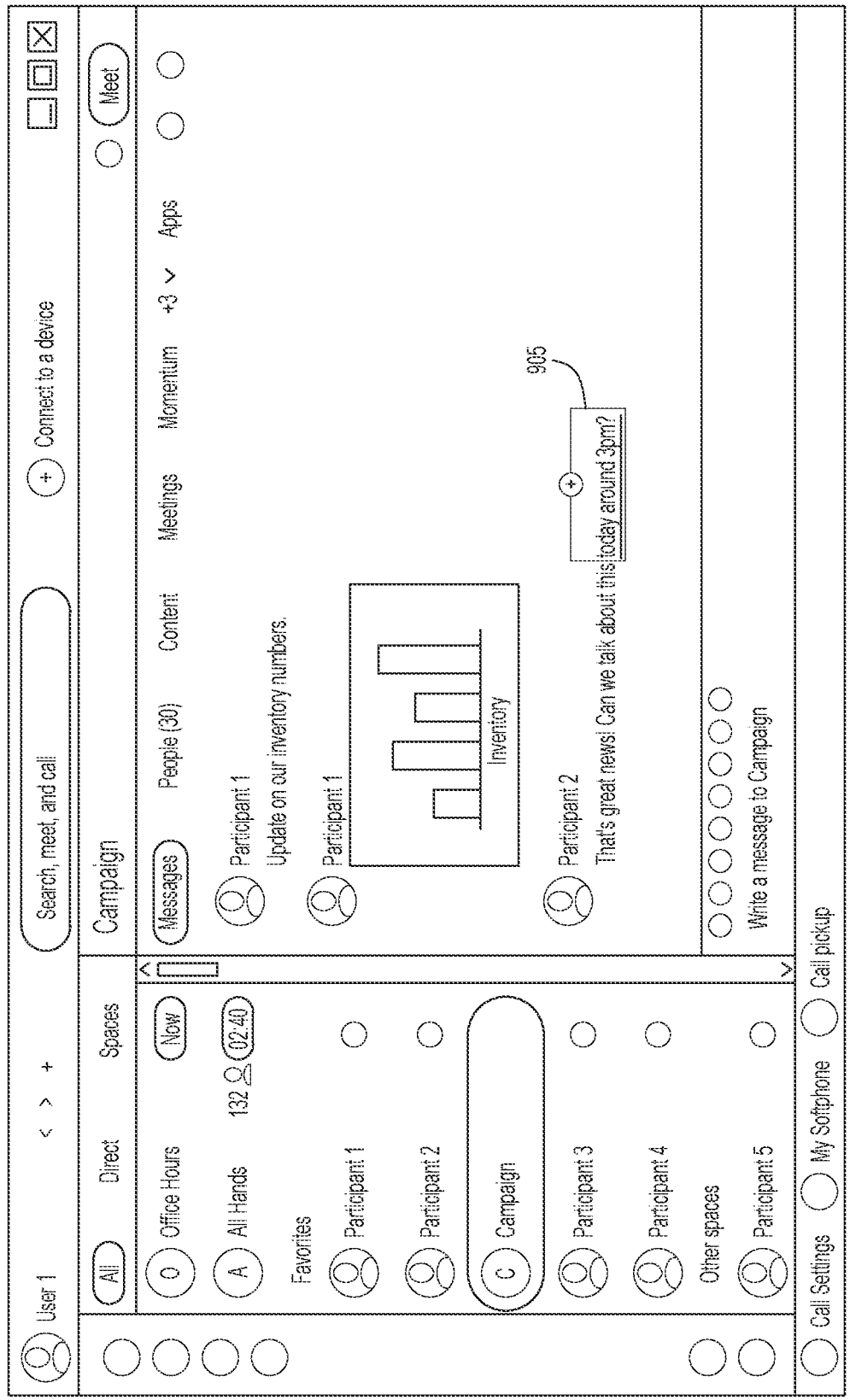
FIG. 9A illustrates a user interface for a collaboration tool with selection of a date for a collaboration action, according to an example embodiment.
Figure 9B:
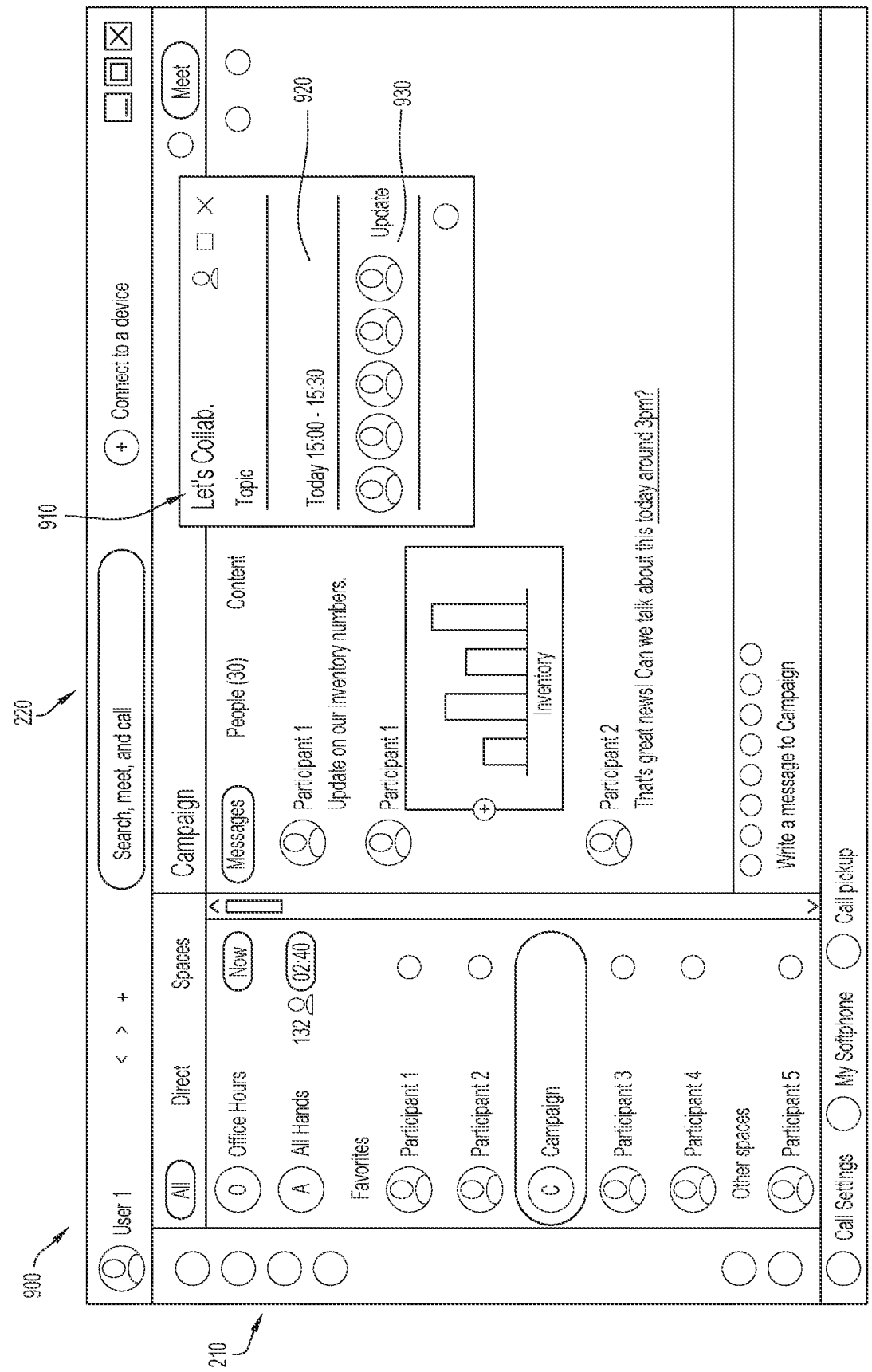
FIG. 9B illustrates the user interface of FIG. 9A providing a collaboration area for forming a meeting, according to an example embodiment.

Date object 905 is placed (e.g., dragged and dropped) in collaboration area 910 (FIG. 9B). The collaboration module analyzes the collaboration area to recommend courses of action in substantially the same manner described above. For example, the collaboration module considers the date object placed in collaboration area 910 and other contextual attributes. The contextual attributes may include text within the message containing the date object (e.g., "can we talk" as viewed in FIG. 9B). Further, since this text was written in a group chat, a recommended action may be scheduling a meeting for the proposed time (e.g., "3 PM"), and including people involved in the group chat. Collaboration area 910 may indicate a suggested proposed time 920 (e.g., "3 PM") and participants for the meeting 930 from the group chat (FIG. 9B).

Figure 9C:
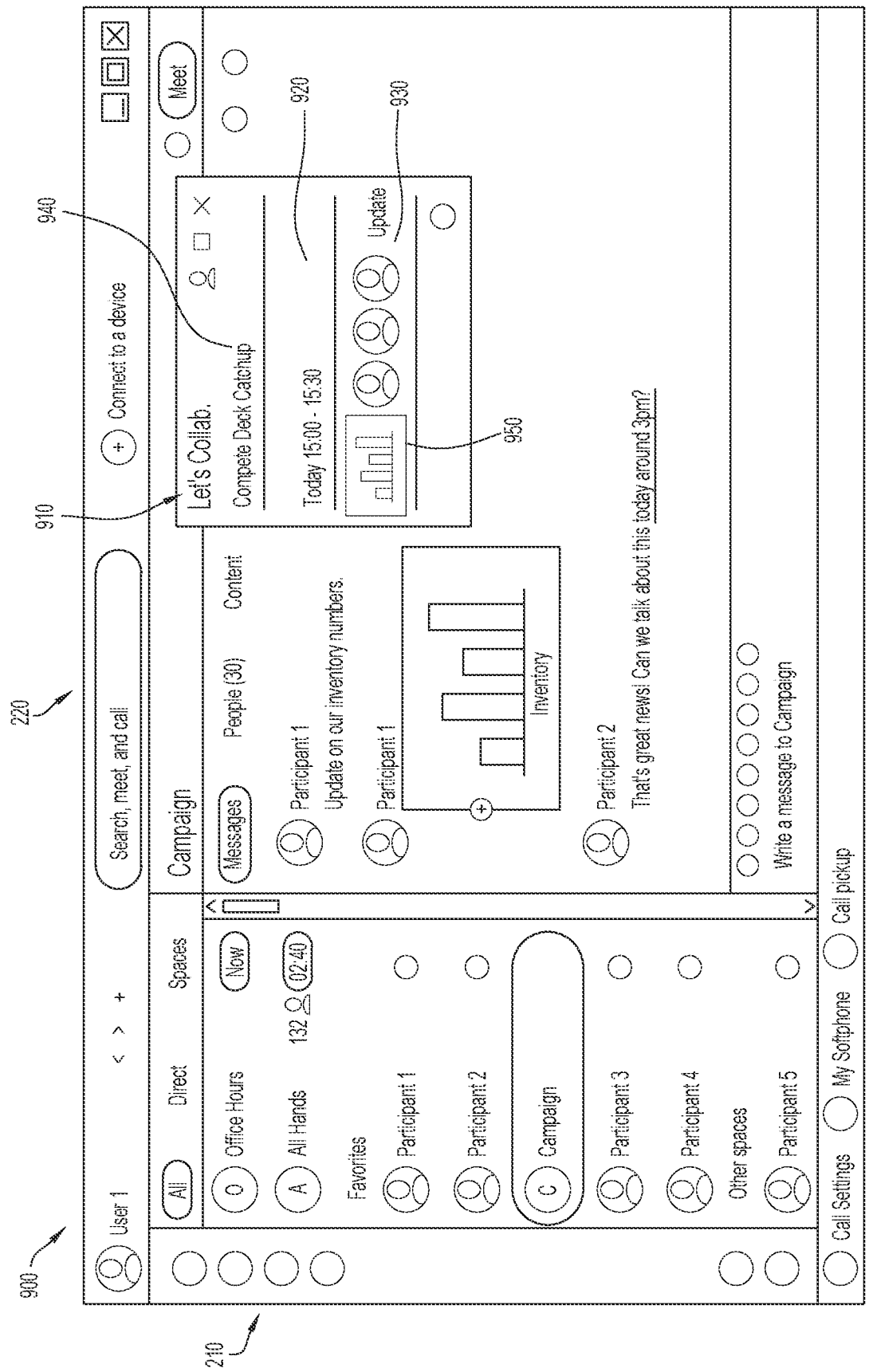
FIG. 9C illustrates the user interface of FIG. 9B providing a meeting with an attached document, according to an example embodiment.

In addition, a file may be highlighted or selected in the group chat to add to collaboration area 910 (FIG. 9C). The file may be attached to the meeting to add more context to the meeting. In this case, the collaboration area further includes a suggested title 940 based on the file, and an attached file object 950 associated with the file. The user may initiate the suggested meeting from user interface 900.

Figure 10:
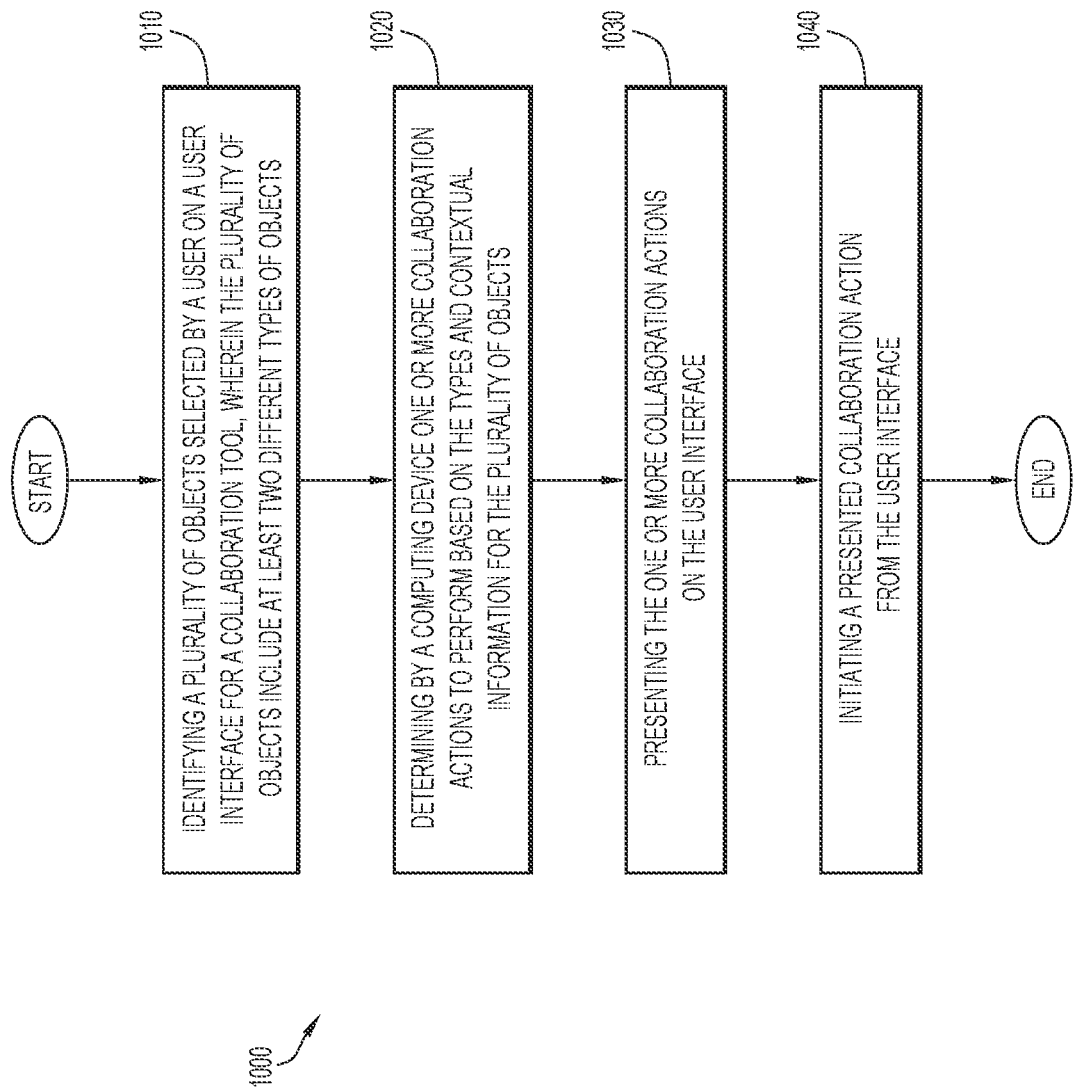
FIG. 10 illustrates a flowchart of a generalized method for determining and performing collaboration actions, according to an example embodiment.

FIG. 10 is a flowchart of an example method 1000 for determining and performing collaboration actions, according to an example embodiment. At operation 1010, a plurality of objects selected by a user on a user interface for a collaboration tool are identified. The plurality of objects include at least two different types of objects. At operation 1020, one or more collaboration actions to perform are determined by a computing device based on the types and contextual information for the plurality of objects. At operation 1030, the one or more collaboration actions are presented on the user interface. At operation 1040, a presented collaboration action is initiated from the user interface.

Figure 11:
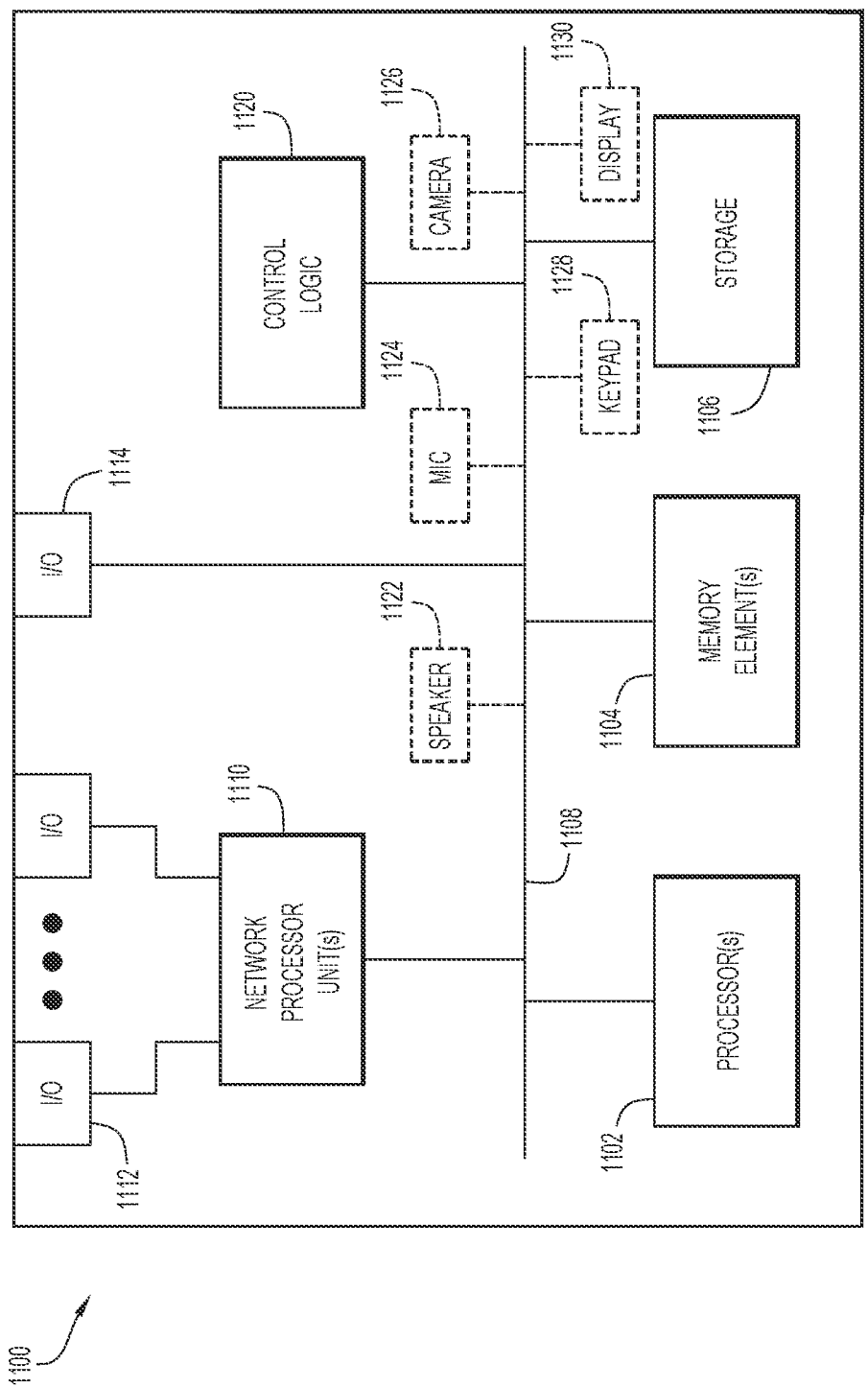
FIG. 11 illustrates a hardware block diagram of a computing device configured to perform functions associated with determining and performing collaboration actions as discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-10. In various embodiments, a computing device, apparatus, or system, such as computing device 1100 or any combination of computing devices 1100, may be configured as any entity/entities (e.g., computer devices, supervisor or other server systems, endpoint devices, etc.) as discussed for the techniques depicted in connection with FIGS. 1-10 in order to perform operations of the various techniques discussed herein.

In at least one embodiment, computing device 1100 may be any apparatus that may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interfaces 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, etc.), computing device 1100 may further include, or be coupled to, an audio speaker 1122 to convey sound, microphone or other sound sensing device 1124, camera or image capture device 1126, a keypad or keyboard 1128 to enter information (e.g., alphanumeric information, etc.), and/or a touch screen or other display 1130. These items may be coupled to bus 1108 or I/O interface(s) 1114 to transfer data with other elements of computing device 1100.

In various embodiments, control logic 1120 can include instructions that, when executed, cause processor(s) 1102 to perform operations, which can include, but not be limited to, providing overall control operations of computing device 1100; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, the machine learning model may learn complex combinations of objects and context with respect to collaboration actions, thereby increasing accuracy and reducing unnecessary processing for initiating unwanted actions. This reduces consumption of processing and memory/storage resources to improve computing performance. In an embodiment, the collaboration module may reside on an end-user device to determine and initiate suggested actions. This offloads processing from a collaboration or server system, and enables an online collaboration (meeting or other online activity) and the action determination to be performed (e.g., in parallel) without degrading performance of the online collaboration (meeting or other online activity).

In an embodiment, the machine learning model may be continuously updated (or trained) based on feedback related to selected collaboration actions. For example, an action may initially be suggested with lower confidence or probability. The suggested action may be subsequently selected over other suggested actions. The selection may be used to update or train the machine learning model to increase the confidence for the initially suggested action (e.g., update or train the machine learning model to increase the probability of the initially suggested action for a scenario, etc.). The user interface may also provide an explicit method to give feedback on the suggested actions. For example, options like "This was helpful" or "Don't show this suggestion again" may be used to train the model. Thus, the machine learning model may continuously evolve (or be trained) to learn further object and context attributes with respect to collaboration actions as the actions are suggested and selected. Further, the matrix may be updated or evolve with respect to mappings of object and context attributes to collaboration actions based on selection of suggested actions. By way of example, primary and secondary actions may be switched based on selected actions and/or new entries may be added for mappings of different combinations of object types and contexts to collaboration actions. New actions may also get added to the matrix when collaboration tools or plugins that provide collaboration actions are installed on the user's system.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments (e.g., collaboration module 150, etc.) may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the device elements described herein may couple to and/or interact with one another through interfaces and/or through any other suitable connection (wired or wireless) that provides a viable pathway for communications. Interconnections, interfaces, and variations thereof discussed herein may be utilized to provide connections among device elements in a system and/or may be utilized to provide communications, interactions, operations, etc. among device elements that may be directly or indirectly connected in the system. Any combination of interfaces can be provided for device elements described herein in order to facilitate operations as discussed for various embodiments described herein.

In various embodiments, any entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory elements 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments (e.g., collaboration module 150, etc.) may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' one or more of, 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and' one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: identifying a plurality of objects selected by a user on a user interface for a collaboration tool, wherein the plurality of objects include at least two different types of objects; determining by a computing device one or more collaboration actions to perform based on the types and contextual information for the plurality of objects; presenting the one or more collaboration actions on the user interface; and initiating a presented collaboration action from the user interface.

In one example, identifying a plurality of objects comprises detecting placement of the plurality of objects selected by the user in an area of the user interface.

In one example, the one or more collaboration actions include a primary collaboration action and at least one secondary collaboration action.

In one example, the plurality of objects include two or more from a group of: contacts, files, links, messages, events, recordings, timestamps, and group chats.

In one example, determining one or more collaboration actions comprises determining the one or more collaboration actions based on a matrix mapping two or more objects to primary and secondary collaboration actions.

In one example, determining one or more collaboration actions comprises determining the one or more collaboration actions using a machine learning model trained to produce collaboration actions based on combinations of object types and corresponding contextual information.

In one example, the contextual information includes one or more from a group of: a current time, user status, an organization directory structure, time zones of relevant contacts, and calendar availability of the user and relevant contacts.

In one example, the method further comprises determining the contextual information based on natural language processing of textual information associated with the plurality of objects.

In another form, an apparatus is provided. The apparatus comprises: a computing system comprising one or more processors, wherein the one or more processors are configured to: identify a plurality of objects selected by a user on a user interface for a collaboration tool, wherein the plurality of objects include at least two different types of objects; determine one or more collaboration actions to perform based on the types and contextual information for the plurality of objects; present the one or more collaboration actions on the user interface; and initiate a presented collaboration action from the user interface.

In another form, one or more non-transitory computer readable storage media are provided. The non-transitory computer readable storage media are encoded with processing instructions that, when executed by one or more processors, cause the one or more processors to: identify a plurality of objects selected by a user on a user interface for a collaboration tool, wherein the plurality of objects include at least two different types of objects; determine one or more collaboration actions to perform based on the types and contextual information for the plurality of objects; present the one or more collaboration actions on the user interface; and initiate a presented collaboration action from the user interface.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   identifying a plurality of objects selected by a user on a user interface for a collaboration tool by detecting placement of the plurality of objects in an area of the user interface separate from an area of the user interface conducting a collaboration session, wherein the plurality of objects include at least two different types of objects;
   determining by a computing device a plurality of collaboration actions to perform based on applying the types and contextual information for the plurality of objects to a matrix, wherein the matrix includes a plurality of combinations of object types and object contextual information that are each mapped to a primary collaboration action and at least one secondary collaboration action, and wherein each secondary collaboration action has less relevance to corresponding object contextual information than the primary collaboration action;
   presenting the plurality of collaboration actions on the user interface for selection;
   initiating a new collaboration session for the plurality of objects based on a selected collaboration action from the user interface; and
   updating primary collaboration actions and secondary collaboration actions of the matrix based on selected collaboration actions from the user interface.

2. The method of claim 1, wherein identifying a plurality of objects comprises:
   detecting placement of the plurality of objects by the user in the area of the user interface separate from the area of the user interface conducting the collaboration session.

3. The method of claim 1, wherein the plurality of collaboration actions presented on the user interface includes a primary collaboration action and at least one secondary collaboration action.

4. The method of claim 1, wherein the plurality of objects includes two or more from a group of: contacts, files, links, messages, events, recordings, timestamps, and group chats.

5. The method of claim 1, wherein determining the plurality of collaboration actions comprises:
   determining a primary collaboration action and at least one secondary collaboration action based on the matrix mapping two or more objects to primary and secondary collaboration actions.

6. The method of claim 1, wherein updating primary collaboration actions and secondary collaboration actions of the matrix comprises:
   switching the primary collaboration actions and the secondary collaboration actions of the matrix based on the selected collaboration actions from the user interface.

7. The method of claim 1, wherein the contextual information includes one or more from a group of: a current time, user status, an organization directory structure, time zones of relevant contacts, and calendar availability of the user and relevant contacts.

8. The method of claim 1, further comprising:
   determining the contextual information based on natural language processing of textual information associated with the plurality of objects.

9. An apparatus comprising:
   a computing system comprising one or more processors, wherein the one or more processors are configured to:
   identify a plurality of objects selected by a user on a user interface for a collaboration tool by detecting placement of the plurality of objects in an area of the user interface separate from an area of the user interface conducting a collaboration session, wherein the plurality of objects include at least two different types of objects;
   determine a plurality of collaboration actions to perform based on applying the types and contextual information for the plurality of objects to a matrix, wherein the matrix includes a plurality of combinations of object types and object contextual information that are each mapped to a primary collaboration action and at least one secondary collaboration action, and wherein each secondary collaboration action has less relevance to corresponding object contextual information than the primary collaboration action;
   present the plurality of collaboration actions on the user interface for selection;
   initiate a new collaboration session for the plurality of objects based on a selected collaboration action from the user interface; and update primary collaboration actions and secondary collaboration actions of the matrix based on selected collaboration actions from the user interface.

10. The apparatus of claim 9, wherein identifying a plurality of objects comprises:
detecting placement of the plurality of objects by the user in the area of the user interface separate from the area of the user interface conducting the collaboration session.

11. The apparatus of claim 9, wherein the plurality of collaboration actions presented on the user interface includes a primary collaboration action and at least one secondary collaboration action.

12. The apparatus of claim 9, wherein the plurality of objects includes two or more from a group of: contacts, files, links, messages, events, recordings, timestamps, and group chats;
wherein the contextual information includes one or more from a group of: a current time, user status, an organization directory structure, time zones of relevant contacts, and calendar availability of the user and relevant contacts; and
wherein the one or more processors are further configured to determine the contextual information based on natural language processing of textual information associated with the plurality of objects.

13. The apparatus of claim 9, wherein determining the plurality of collaboration actions comprises:
determining a primary collaboration action and at least one secondary collaboration action based on the matrix mapping two or more objects to primary and secondary collaboration actions.

14. The apparatus of claim 9, wherein updating primary collaboration actions and secondary collaboration actions of the matrix comprises:
switching the primary collaboration actions and the secondary collaboration actions of the matrix based on the selected collaboration actions from the user interface.

15. One or more non-transitory computer readable storage media encoded with processing instructions that, when executed by one or more processors, cause the one or more processors to:
identify a plurality of objects selected by a user on a user interface for a collaboration tool by detecting placement of the plurality of objects in an area of the user interface separate from an area of the user interface conducting a collaboration session, wherein the plurality of objects include at least two different types of objects;
determine a plurality of collaboration actions to perform based on applying the types and contextual information for the plurality of objects to a matrix, wherein the matrix includes a plurality of combinations of object types and object contextual information that are each mapped to a primary collaboration action and at least one secondary collaboration action, and wherein each secondary collaboration action has less relevance to corresponding object contextual information than the primary collaboration action;
present the plurality of collaboration actions on the user interface for selection;
initiate a new collaboration session for the plurality of objects based on a selected collaboration action from the user interface; and
update primary collaboration actions and secondary collaboration actions of the matrix based on selected collaboration actions from the user interface.

16. The one or more non-transitory computer readable storage media of claim 15, wherein identifying a plurality of objects comprises:
detecting placement of the plurality of objects by the user in the area of the user interface separate from the area of the user interface conducting the collaboration session.

17. The one or more non-transitory computer readable storage media of claim 15, wherein the plurality of collaboration actions presented on the user interface includes a primary collaboration action and at least one secondary collaboration action.

18. The one or more non-transitory computer readable storage media of claim 15, wherein the plurality of objects includes two or more from a group of: contacts, files, links, messages, events, recordings, timestamps, and group chats;
wherein the contextual information includes one or more from a group of: a current time, user status, an organization directory structure, time zones of relevant contacts, and calendar availability of the user and relevant contacts; and
wherein the processing instructions further cause the one or more processors to determine the contextual information based on natural language processing of textual information associated with the plurality of objects.

19. The one or more non-transitory computer readable storage media of claim 15, wherein determining the plurality of collaboration actions comprises:
determining a primary collaboration action and at least one secondary collaboration action based on the matrix mapping two or more objects to primary and secondary collaboration actions.

20. The one or more non-transitory computer readable storage media of claim 15, wherein updating primary collaboration actions and secondary collaboration actions of the matrix comprises:
switching the primary collaboration actions and the secondary collaboration actions of the matrix based on the selected collaboration actions from the user interface.

\* \* \* \* \*